(12) United States Patent
Trucco

(10) Patent No.: US 10,178,914 B2
(45) Date of Patent: Jan. 15, 2019

(54) SLEEP ASSIST DEVICE FOR SEATED PERSONS

(71) Applicant: Horacio Andres Trucco, San Juan, PR (US)

(72) Inventor: Horacio Andres Trucco, San Juan, PR (US)

(73) Assignee: AeroSiesta Holdings, LLC, San Juan, PR (US)

( * ) Notice: Subject to any disclaimer, the term of this patent is extended or adjusted under 35 U.S.C. 154(b) by 189 days.

(21) Appl. No.: 15/344,517

(22) Filed: Nov. 6, 2016

(65) Prior Publication Data

US 2017/0112291 A1    Apr. 27, 2017

(51) Int. Cl.
*A47C 16/00* (2006.01)
*A47C 7/38* (2006.01)
*B60N 2/806* (2018.01)

(52) U.S. Cl.
CPC .............. *A47C 16/00* (2013.01); *A47C 7/383* (2013.01); *B60N 2/806* (2018.02)

(58) Field of Classification Search
None
See application file for complete search history.

(56) References Cited

U.S. PATENT DOCUMENTS 3,428,235 A * 2/1969 Randazzo .............. B65D 71/36
                                                            206/427

3,727,979 A * 4/1973 Schier ...................... A47B 3/12
                                                            126/9 A (Continued)

*Primary Examiner* — David E Allred

(57) ABSTRACT

A sleep assist device for seated persons that when placed either on top of a seated person's lap, over a desk, on an airliner seat tray table or any equivalent base contiguous to said seated person provides him/her with an adequate raised support for his/hers head and also allows the seated person to embrace (to hug) a two-open-ends box-like structure 10 by positioning his/her arms and hands inside an open-throughout volumetric-space 12 preferably over-and-around a pair of inner panels 17-17 in a cozy and comfortable resting posture that, indeed, is conducive to relaxation and sleep. Meanwhile, a vertical panel 16 that is connected to the pair of inner panels 17-17 may contact said seated person's chest. The sleep assist device for seated persons when folded up for storage or to be carried is relatively small and lightweight, allowing a user to conveniently place it into: carry-on luggage, a ladies' handbag, a business briefcase or a suitcase. This sleep assist device for seated persons is likely to be readily accepted by a relatively large percentage of passengers traveling by airplane, buses, trains and in an automobile's rear seat, as well as persons wishing to nap at their workplace, at home, while waiting at a hospital or office, or during camping or at a beach outing and, furthermore, by ailing persons confined to nursing homes that need to be seated in wheelchairs or sofas during extended periods of time. In addition, said two-open-ends box-like structure 10 provides a novel, useful and unobvious medium to display advertisements, logos or the subject matter required on airlines passenger safety cards because its surfaces can be printed on utilizing any of the available methods employed by the packaging industry or, otherwise, may have labels affixed to them.

9 Claims, 8 Drawing Sheets

Sleep Assist Device for Seating Persons
Utilization Mode

(56) References Cited

U.S. PATENT DOCUMENTS

| | | | | |
|---|---|---|---|---|
| 4,556,253 A * | 12/1985 | Geneve | A47C 5/005 | 248/174 |
| 4,607,784 A * | 8/1986 | Calabrese | A45C 3/00 | 190/116 |
| 4,984,848 A * | 1/1991 | Scalisi | A47C 5/005 | 248/152 |
| 5,382,081 A * | 1/1995 | Henry | A47C 5/005 | 206/815 |
| 5,622,403 A * | 4/1997 | Gonda | B63B 7/06 | 114/363 |
| 5,697,675 A * | 12/1997 | DeWitt | A47C 5/005 | 297/188.01 |
| 5,752,743 A * | 5/1998 | Garelik | A47C 4/02 | 297/440.12 |
| 6,161,901 A * | 12/2000 | Avner | A47C 5/005 | 108/165 |
| 6,206,473 B1 * | 3/2001 | Kondratiev | A47B 13/003 | 297/440.1 |
| D584,064 S * | 1/2009 | Chu | D6/349 | |
| 7,540,041 B2 * | 6/2009 | Gara | A47K 11/06 | 297/440.12 |
| 7,788,751 B1 * | 9/2010 | Diemen | A47C 16/00 | 297/391 |
| 8,240,770 B2 * | 8/2012 | Bertele | A47B 43/02 | 297/440.12 |
| 8,984,688 B1 * | 3/2015 | Ibrahim | A47G 9/10 | 5/632 |
| 9,943,179 B1 * | 4/2018 | May | A47G 9/1063 | |
| 2013/0276236 A1 * | 10/2013 | Rasmussen | A47G 9/1027 | 5/640 |
| 2015/0238018 A1 * | 8/2015 | Backer | A47C 7/46 | 5/640 |
| 2016/0331126 A1 * | 11/2016 | Mills | B60N 2/806 | |

\* cited by examiner

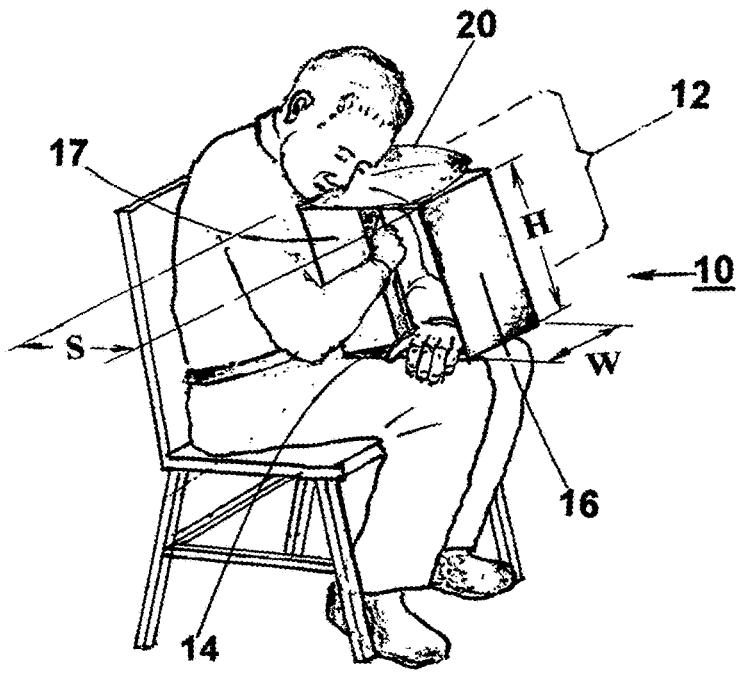
Figure 1 Sleep Assist Device for Seating Persons Utilization Mode
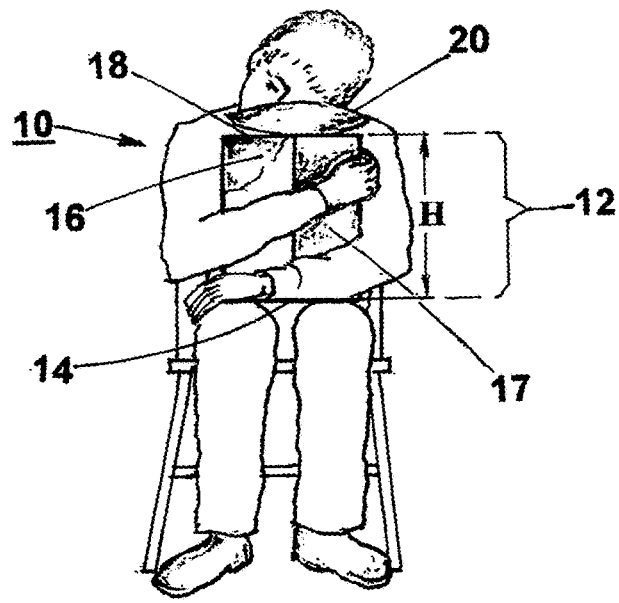
Figure 2 Sleep Assist Device for Seating Persons Utilization Mode

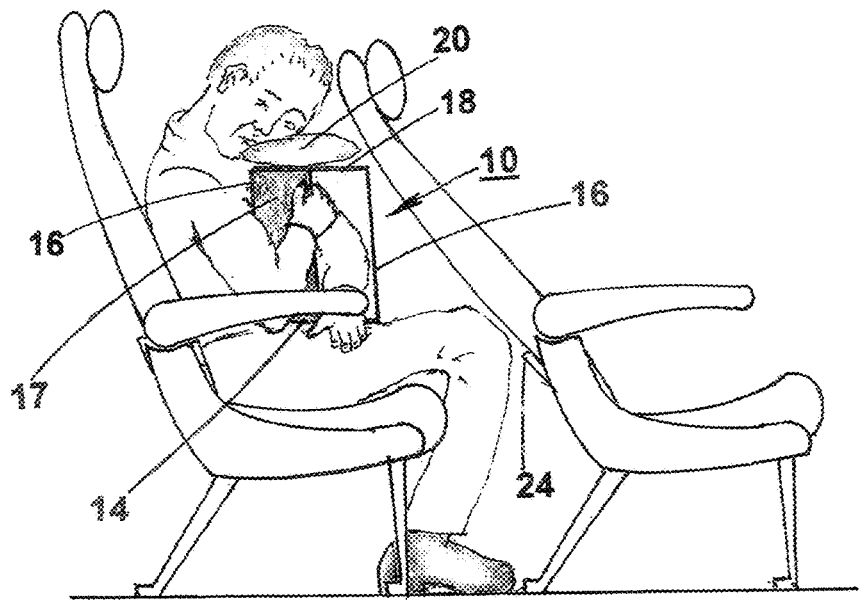
Figure 3 Sleep Assist Device for Seating Persons Utilization Mode
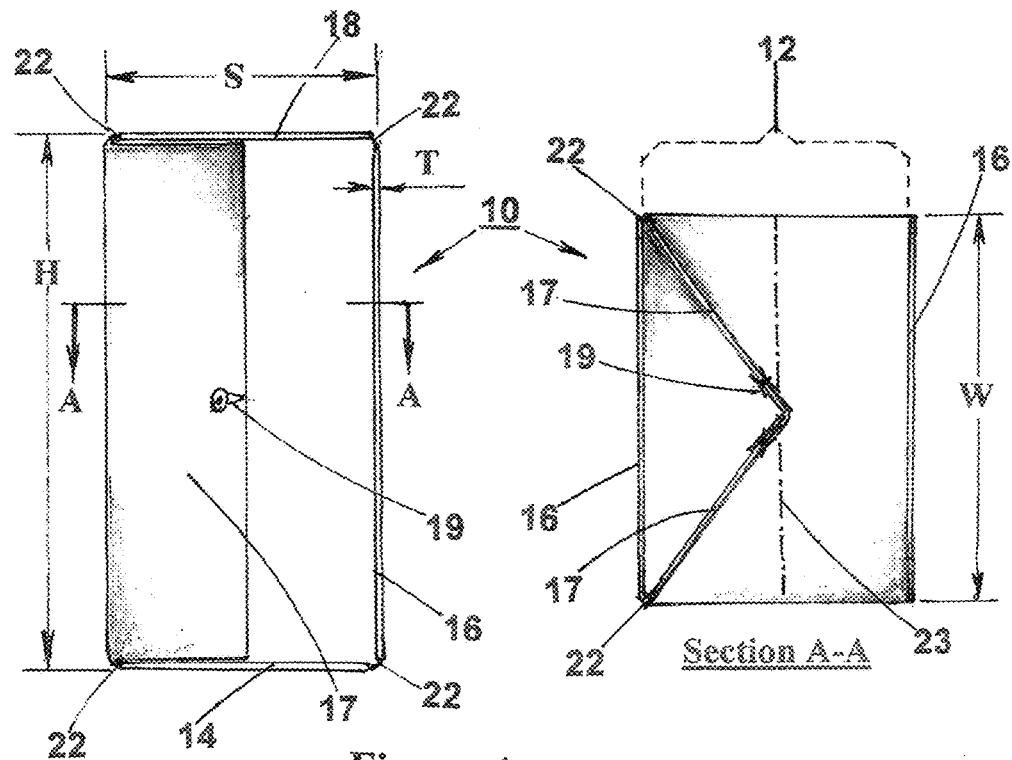
Figure 4 First Embodiment

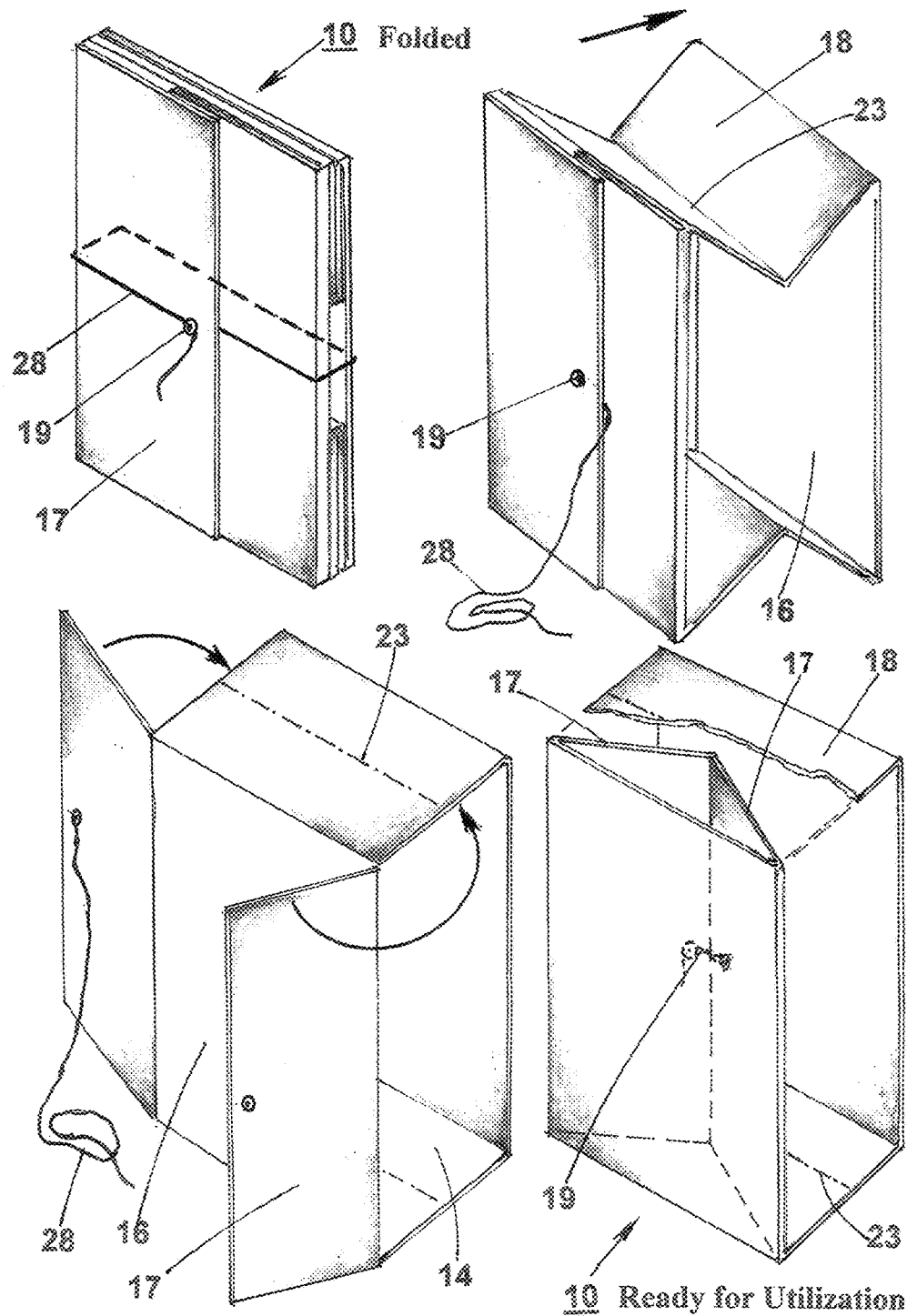
Figure 5 First Embodiment – Unfolding Steps

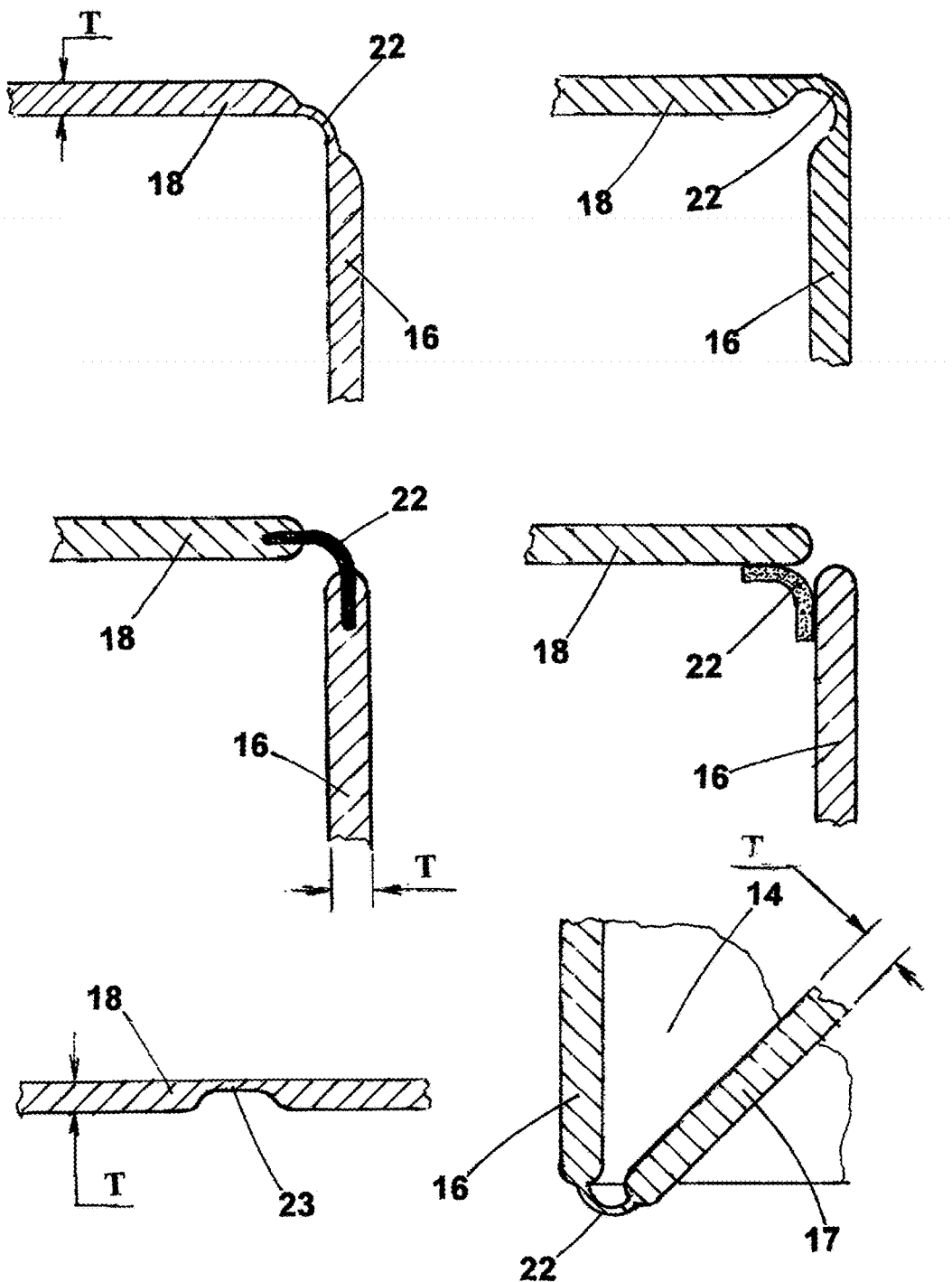
Figure 6 Means for Hinged Corner and Means for Middle Hinge

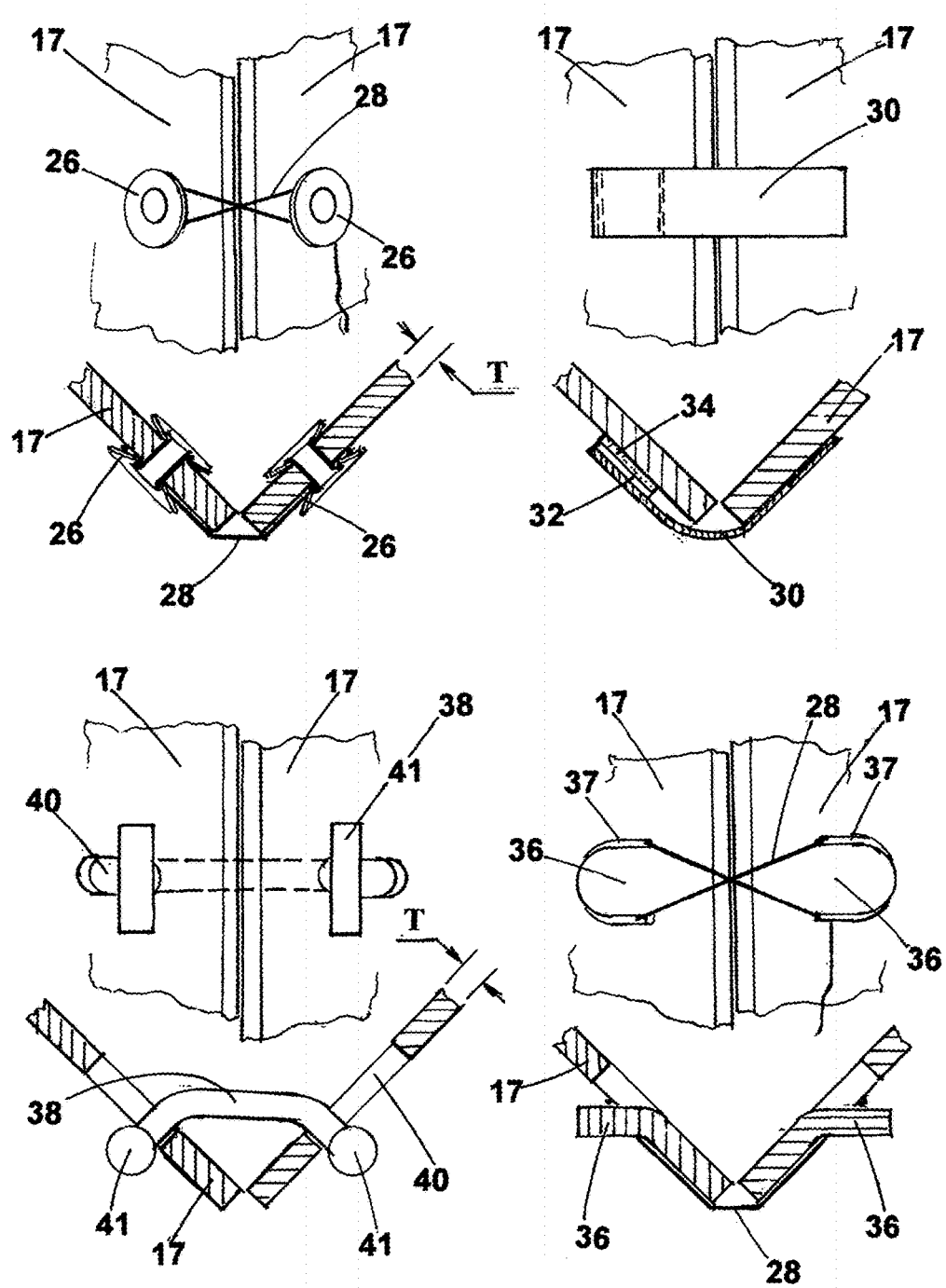
Figure 7 Means for Attachment

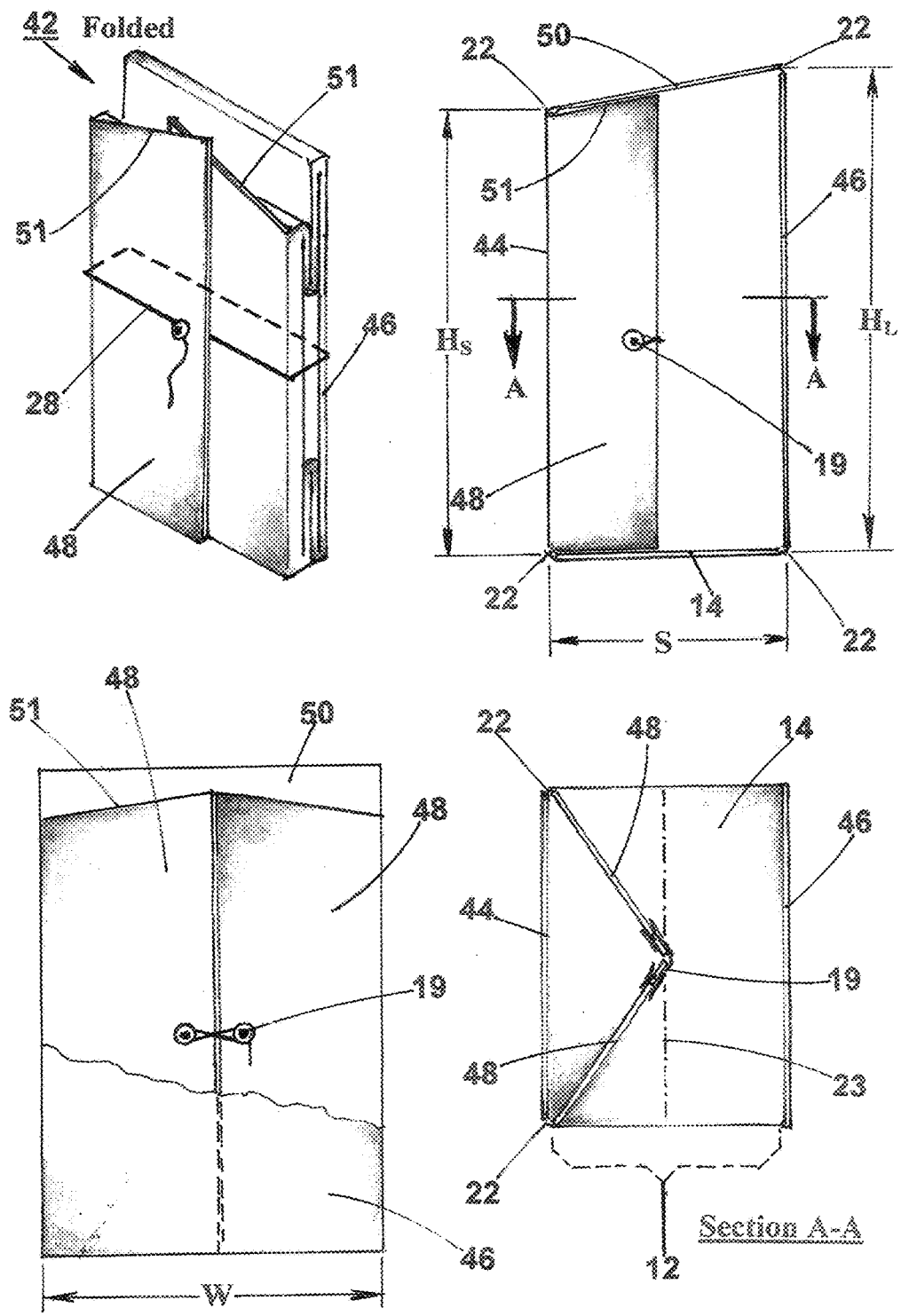
Figure 8 Second Embodiment

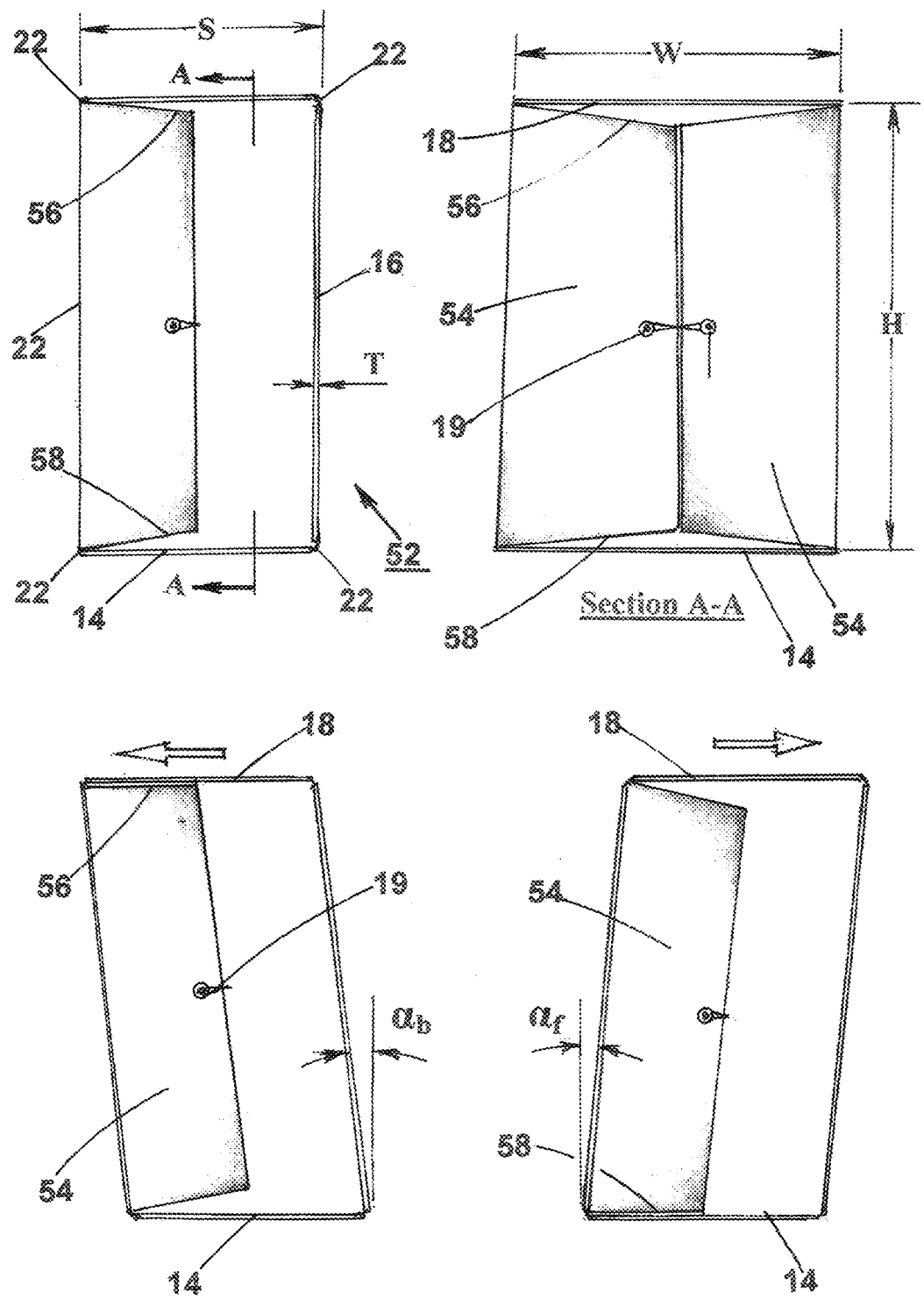
Figure 9 Third Embodiment

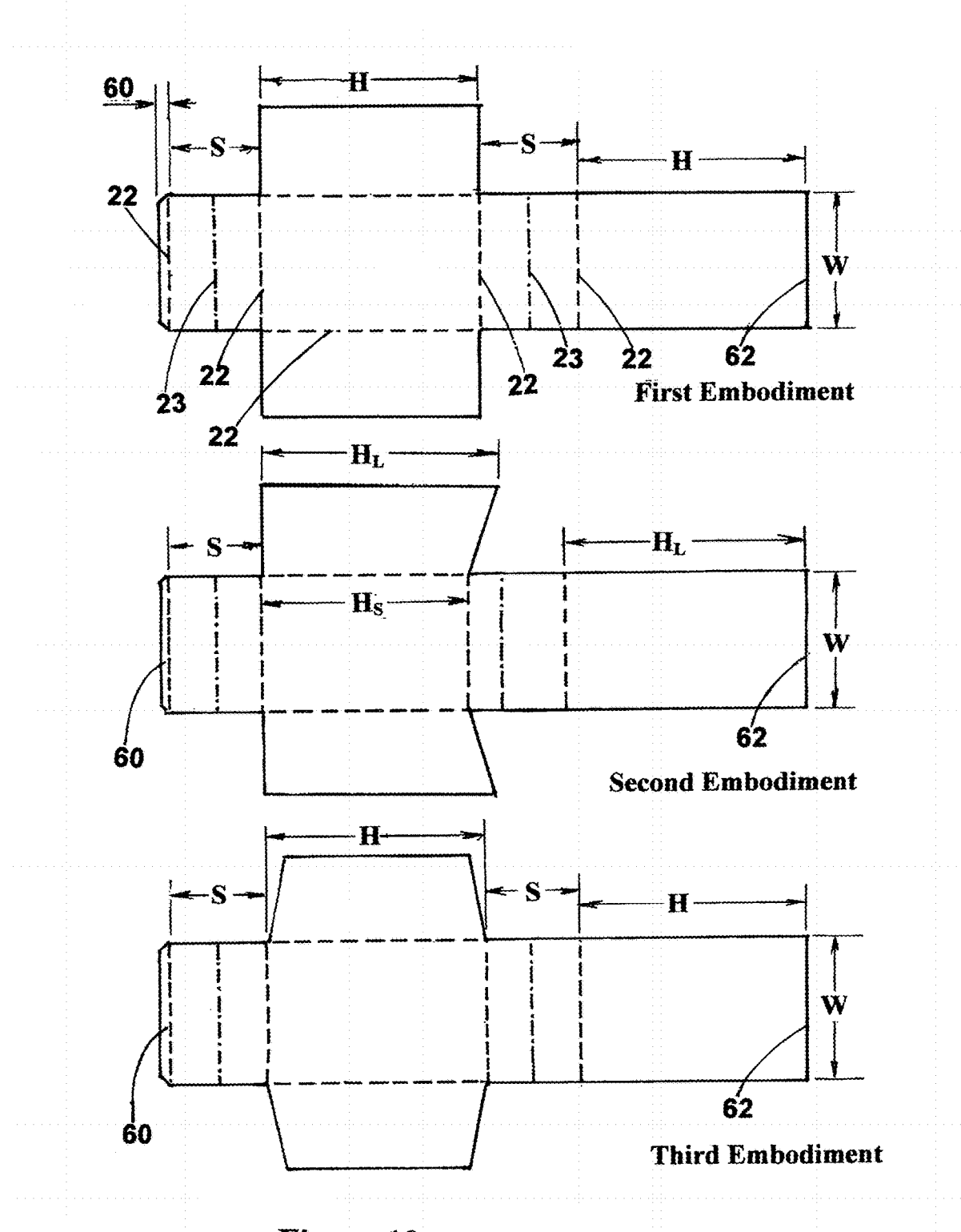
Figure 10  Fabrication Templates

SLEEP ASSIST DEVICE FOR SEATED PERSONS

CROSS-REFERENCE TO RELATED APPLICATION

This application claims the benefit of Provisional Patent Application EFS ID 24204025—Application No. 62/260,492—Confirmation Number 1648—Title of Invention SLEEP ASSIST DEVICE FOR SEATED PERSONS, filed Nov. 28, 2015 by the present inventor, which is incorporated by reference.

FIELD OF INVENTION

This disclosure relates to a simple, inexpensive, and innovative device for assisting any seated person to relax or to sleep comfortably. The device may be placed on a seated person's lap, over a desk, on an airliner seat tray table or any equivalent base contiguous to said seated person providing him or her with a satisfactory raised support for his or her head. The device is very helpful to passengers while seated during commercial airline trips, train, bus or vehicle travel and various other seated situations in daily life.

BACKGROUND DESCRIPTION OF THE PRIOR ART

To most persons it is very difficult to sleep comfortably during traveling while sitting in a confined space since many body muscles are unnecessarily strained to maintain said sitting posture, thus preventing the reaching of the passive state of mind essential to relaxation and sleep.

There is a large variety of devices intended to assist travelers to relax or sleep while seated in economy class airplane, train, bus or vehicle seats. Among them we find a very large selection of "neck pillows" with a U- or C-shaped design available for purchase. Said neck pillows do help some seated persons to, in a very limited and temporary manner, relax or sleep. Examples are found by searching their related web sites.

Other types of sleep assist devices have been disclosed by numerous prior art issued patents. Nevertheless, many have never become popularized or manufactured. Some are portable, to be carried along by a person, while others are intended to be stored around passenger airplane seats. However, all of them exhibit disadvantages because they either are expensive, uncomfortable to be used, do not fully foment relaxation or sleep, or are too bulky to be carried by individuals or stored in an airplane cabin, train or other vehicle.

A few examples are examined next. The U.S. Pat. No. 8,584,283 issued to Robert Mabry on Nov. 19, 2013 is one of various prior art examples of sleep assist devices that would not be useful to most persons because it is bulky, heavy and consists of a complex and costly structure. The U.S. Pat. No. 8,528,978 issued to William J. Purpura, et al. on Sep. 10, 2013 is also a complex and costly structure that must be attached to an airplane seat, and would therefore likely require airline approval for its use onboard. The U.S. Pat. No. 7,681,769 issued to Robert F. Kramer on Mar. 23, 2010 is a backpack that can also be utilized as a sleep assist device. In addition to being bulky and relatively heavy, it must be constantly strapped to the wearer's shoulders. Said device does not support a posture conducive to relaxation or sleep. Perry W. Haddon's U.S. Patent Application 20040026979 filed Feb. 12, 2004 discloses a sleep assist device that is uncomfortable to be used and is relatively bulky.

In conclusion, if a novel device could offer a seated person an effective approach to achieving an ergonomically comfortable, relaxing posture and/or extended sleeping time, it would be immediately accepted by a relatively large percentage of the traveling population. Such a novel device would contribute to a significant reduction of tiredness, fatigue, and sleepiness, therefore improving humanity's overall work productivity and enjoyment of life. An optimal sleep assist device should be simple, inexpensive, light weight, fit into small area to be easily carried, and require minimal assembly prior to utilization.

When this inventor realized the urgent human need to create a more acceptable and more pleasurable sleep assist device than those offered by prior art, the purposes of this invention were inspired, leading to the conception and the accomplishment of this invention.

This disclosure describes a novel, non-obvious, useful and attractive sleep assist device that, when utilized, assures seated persons a very comfortable relaxation or sleep.

Advantages of the Invention

This invention provides manufacturers of sleep assist devices with a novel, safe, reliable, useful and less costly approach to fabricating sleep assist devices intended for utilization by seated persons.

Some presently foreseen utilizations of this invention by seated persons in diverse situations include: (1) passengers traveling by airplane, bus or train; (2) passengers traveling in an automobile's rear seat; (3) persons napping at their workplace, at home, while waiting at a hospital or office, during camping or relaxing at a beach; (4) ailing persons confined to hospitals or nursing homes that need to be seated in a wheelchair or a sofa during extended periods of time.

Further advantages of this disclosure will become apparent upon consideration of the following drawings and description.

BRIEF DESCRIPTION OF THE DRAWING FIGURES

FIG. 1 shows in perspective view a person seated in a chair while utilizing an embodiment of the herein disclosed sleep assist device for seated persons.

FIG. 2 shows in frontal view the seated person depicted by FIG. 1.

FIG. 3 shows in side view a passenger seated in an airplane cabin while utilizing an embodiment of the herein disclosed sleep assist device for seated persons.

FIG. 4 shows, in side view and a cross-section, construction detail corresponding to the first embodiment of the disclosed sleep assist device for seated persons.

FIG. 5 shows, in isometric views, the first embodiment folded up as intended for storage or transport (see top left-hand illustration) and the unfolding steps required to attain a ready for utilization device (see bottom right-hand illustration).

FIG. 6 shows, in cross-sections, alternative configurations to construct means for hinged corners and means for middle hinges.

FIG. 7 shows, in side views and cross-sections, four alternative means for attachment.

FIG. 8 shows, in a perspective view and side views, construction detail corresponding to the second embodiment of the disclosed sleep assist device for seated persons. Notice that its top surface is setup in a slanted direction.

FIG. 9 shows, in side views, construction detail corresponding to the third embodiment of the disclosed sleep assist device for seated persons. Notice the truncated shape of its pair of inner panels that allows a predetermined backward or forward translation of its top surface.

FIG. 10 shows, in planar views, a possible approach to manufacture each of the three embodiments disclosed hereinafter by utilizing flat sheet material.

REFERENCE NUMERALS IN DRAWINGS

An annotation surrounded by parentheses, appearing immediately after a cited part, assists the reader to identify: its relationship to other part(s), its function, its definition, its physical property or the paragraph where it is first described. Parts that are analogous while depicted in different figures are assigned the same reference numeral. In order to simplify the figures, by avoiding clutter, when there is a multiplicity of parts comprising an embodiment only a few of said multiplicity of parts have their corresponding reference numerals shown. Underlined numerals represent an assembly. The parts cited in the following description are:
10 two-open-ends box-like structure
12 open-throughout volumetric-space (space formed inside 10, 42 and 52,)
14 hinged base surface (a part of it 42 and 52,)
16 vertical panel (a part of 10, and 52,)
17 inner panel (a part of 10,)
18 hinged top surface (a part of 10 and 52,)
19 means for attachment (part of 17-17, 48-48 and 54-54,)
20 pillow (not a part of the embodiments—
22 means for hinged corner (a part of 10, 42 and 52,)
23 means for middle hinge (a part of 14, 18 and 50,)
24 front seat pocket (not a part of the embodiments—
26 hook button (a part of 19,)
28 string tie (a part of 19,)
30 flexible tape (a part of 19,)
32 hook segment (a part of 19,)
34 loop segment (a part of 19,)
36 tongue (a part of 17, 48 and 54,)
37 U-shape cut-out (a part of 17, 48 and 54,)
38 elastic H-shape clamp (a part of 19,)
40 horizontal slot (a part of 17, 48 and 54,)
41 end stub (a part of 38,)
42 two-open-ends box-like slanted structure (second embodiment, )
44 short vertical panel (a part of 42)
46 long vertical panel (a part of 42,)
48 slanted inner panel (a part of 42,)
50 hinged slanted top surface (a part of 42,)
51 upper edge (a part of 48,)
52 two-open-ends box-like shift-able structure (third embodiment, )
54 truncated inner panel (a part of 52,)
56 inclined top edge (a part of 54,)
58 inclined bottom edge (a part of 54,)
60 joining flap,
62 free end,
$\alpha_b$ backward angular displacement (when 52 is shifted,)
$\alpha_f$ forward angular displacement (when 52 is shifted,)
H height (measurement of the vertical panel 16,)
$H_S$ height (measurement of the short vertical panel 44,)
$H_L$ height (measurement of the long vertical panel 46,)
S forward span (measurement of 18 and 50,)
T thickness (measurement of 14, 16, 17, 18, 44, 46, 48, 50 and 54) and
W width (measurement of 14, 44 and 46.)

DESCRIPTION OF SPECIFIC EMBODIMENTS

It is useful to understand the basic structural components necessary to be comprised by all embodiments as well as their mode of utilization in order to appreciate the scope, the novelty and the non-obvious nature of this disclosure.

As noticed by examining FIGS. 1 through 5 the first embodiment corresponding to the herein disclosed Sleep Assist Device For Seated Persons comprises a two-open-ends box-like structure 10 that allows a seated person to place his hands and arms inside an open-throughout volumetric-space 12 and comfortably rest them over the top side of a hinged base surface 14 that has been previously placed on said seated person's lap, over a desk, on an airliner seat tray table or any equivalent base contiguous to said seated person. The two-open-ends box-like structure 10 further includes a pair of vertical panels 16-16, a pair of inner panels 17-17, a hinged top surface 18 and means for attachment 19 to fasten together said pair of inner panels 17-17.

In particular, FIG. 4 shows, in side view and a cross-section, construction detail of said two-open-ends box-like structure 10 when deployed ready for utilization.

In particular, FIG. 5 shows, in isometric views, detail for the two-open-ends box-like structure 10 at various situation, i.e.: folded up mode as required for storage or transport (see top left-hand illustration), unfolding steps necessary to attain a ready for utilization condition and a completely unfolded sleep assist device (see bottom right-hand illustration). Prior to utilization of the two-open-ends box-like structure 10 said pair of inner panels 17-17 is placed (via rotation) inside the space enclosed by the hinged base surface 14, the pair of vertical panels 16-16 and the hinged top surface 18, consequently, preventing shifting of the hinged top surface 18 with relation to the hinged base surface 14. Accordingly, the two-open-ends box-like structure 10 became a relatively stable and almost rigid unit.

Fastening together the pair of inner panels 17-17 prevents any unintended folding of the two-open-ends box-like structure 10 during utilization.

Notice that said open-throughout volumetric-space 12 (see Section A-A on FIG. 4) is enclosed within the six walls that are sequentially interconnected as follows: the hinged base surface 14 connects to one vertical panel 16 which itself connects to the hinged top surface 18 which itself connects to a second vertical panel 16 and itself connects to the base surface 14 while said pair of inner panels 17-17 connects to one of said vertical panels 16, see FIGS. 1 through 5. Each of the six connections described is made by a means for hinged corner 22. Both the hinged base surface 14 and the hinged top surface 18 include a means for middle hinge 23, a feature required to be able to foldup said two-open-ends box-like structure 10 after use.

Said open-throughout volumetric-space 12 is a very important feature built-in all the embodiments disclosed hereafter.

An assortment of configurations are acceptable to construct said means for hinged corners 22s as well as said means for middle hinges 23s. Among numerous options available, a few of them are depicted by FIG. 6. Notice that all illustrated configurations for corners 22s and hinges 23s are thinner than the thickness "T" of adjacent connecting parts thus allowing them to be bent in order to attain either a folded up or an unfolded assembly. Additional configurations to construct said means for hinged corners 22s as well as said means for middle hinges 23s will become apparent to those skilled in the art without departing from the spirit and scope of this disclosure.

FIG. 7 shows, in front view and cross-section, four configurations acceptable to construct said means for attachment 19. The top left-hand illustration utilizes a hook button 26 affixed to each of said inner panels 17 and a string tie 28 affixed to one of said hook buttons 26, which allow to fasten together said pair of inner panels 17-17 when said string tie 28 is wound around and under said hook buttons 26-26.

The top right-hand illustration on FIG. 7 utilizes a hook-and-loop fastener system. A flexible tape 30 is affixed to one of said inner panel 17 and the free end of the flexible tape 30 holds a hook segment 32 (part of said hook-and-loop fastener system) and a loop segment 34 (also part of said hook-and-loop fastener system) is affixed to the second inner panel 17. They allow fastening together said pair of inner panels 17-17 when the hook segment 36 and the loop segment 38 are affixed together.

The bottom right-hand illustration on FIG. 7 utilizes a pair of tongues 36-36 formed (into each of said pair of inner panels 17-17) by a U-shaped cut-out 37 and a string tie 28 affixed to one of said tongues 36. They allow fastening together said pair of inner panels 17-17 when said string tie 28 is wound around and under said pair of tongues 36-36.

The bottom left-hand illustration on FIG. 7 utilizes an elastic H-shape clamp 38. Clamp 38 is inserted-and-elongated through a pair of horizontal slots 40s (a cutout existing on each inner panel 17). Then said elastic H-shape clamp 38 is rotated about 90 degrees so that a pair of end stubs 41-41 became relatively vertical preventing disengagement of the elastic H-shape clamp 38 from the pair of inner panels 17-17. Additional configurations to construct the means for attachment 19 will become apparent to those skilled in the art without departing from the spirit and scope of this disclosure.

Possible modes of utilization for the disclosed sleep assist device are illustrated by FIGS. 1, 2 and 3. It is necessary to understand such modes of utilization in order to realize the novel, non-obvious and useful attributes exhibited by this disclosure that, in fact, are not offered by the prior art. Said open-throughout volumetric-space 12 allows a seated person to embrace (to hug) the two-open-ends box-like structure 10 by positioning his/her arms and hands over-and-around said pair of inner panels 17-17 in a cozy and comfortable resting posture that, indeed, is conducive to relaxation or sleep. Meanwhile, the vertical panel 16 that is connected to said inner panels 17-17 may contact said seated person's chest.

Alternatively, said person could place a pillow 20 over the hinged top surface 18 prior to placing his head on the pillow 20.

Notice on FIG. 2 that the frontally-located vertical panel 16 is shown as partially transparent in order to better illustrate the embracing (hugging) posture described above.

The height "H" of the vertical panels 16-16 is predetermined to adjust to said person's torso size. The width "W" of the hinged base surface 14 is predetermined to extend across said person's lap. The hinged top surface 18 forward span "S" is predetermined to allow for comfortable head support.

Referring to FIG. 3 notice that an airline passenger is capable of comfortably utilizing the disclosed sleep assist device while seated inside a confined space. This advantage is not offered by prior art sleep assist devices.

Previously or after its use, the two-open-ends box-like structure 10 can be folded up (by reversing the steps depicted on FIG. 5) for convenient storage into an airplane's front seat pocket 24 or to be carried in a bag, purse, suitcase or briefcase. See top left-hand illustration on FIG. 5.

A variety of adequate materials are readily available to construct the two-open-ends box-like structure 10 as well as the following embodiments to be described hereinafter, i.e.: solid or hollow panels or plastic sheets fashioned with ridges to attain rigidity. The material could be recyclable (such as corrugated cardboard) or durable (such as corrugated plastic board), metal, composite types, wood, etc. The stiffness of any part must be sufficient to safely support the loads imposed by a person's head resting atop said hinged top surface 18. That stiffness depends on the construction material selected and the magnitude of the thickness "T" of a given part. A particular embodiment can be constructed employing dissimilar construction materials selected from the list mentioned above.

FIG. 8 shows, in perspective and orthogonal views, a second embodiment for the disclosed Sleep Assist Device For Seated Persons comprising a two-open-ends box-like slanted-structure 42 that allows a seated person to place his hands and arms inside an open-throughout volumetric-space 12 and comfortably rest them over the top of a hinged base surface 14 that has been previously placed on said seated person's lap, over a desk, on an airliner seat tray table or any equivalent base contiguous to said seated person. The two-open-ends box-like slanted-structure 42 further includes a short vertical panel 44, a long vertical panel 46, a pair of slanted inner panels 48-48, a hinged slanted top surface 50 and means for attachment 19 to fasten together said pair of slanted inner panels 48-48. Each slanted inner panel 48 features an upper edge 51 inclined so as to match the inclination of said hinged slanted top surface 50.

Prior to utilization of the two-open-ends box-like slanted-structure 42 said pair of slanted inner panels 48-48 is placed (via rotation) inside the space enclosed by the hinged base surface 14, the short vertical panel 44, the hinged slanted top surface 50 and the long vertical panel 46, consequently preventing shifting of the hinged slanted top surface 50 with relation to the hinged base surface 14. Accordingly, the two-open-ends box-like structure 10 becomes a relatively rigid unit.

Notice that said open-throughout volumetric-space 12 is enclosed within the six walls that are sequentially interconnected as follows: the hinged base surface 14 connects to the short vertical panel 44 itself connects to the hinged slanted top surface 50 itself connects to the long vertical panel 46 and itself connects to the hinged base surface 14 while said pair of slanted inner panels 48-48 connect to the short vertical panel 44. Each connection among said six walls is made by a means for hinged corner 22. Both the hinged base surface 14 and the hinged slanted top surface 50 include a means for middle hinge 23, a feature required to be able to foldup said second embodiment after use.

Said open-throughout volumetric-space 12 is an indispensable feature built-in all the embodiments disclosed herein.

Possible modes of utilization for the two-open-ends box-like slanted-structure 42 is illustrated by FIGS. 1, 2 and 3 when depicted two-open-ends box-like structure 10 is replaced by said two-open-ends box-like slanted structure 42. It is necessary to understand such mode of utilization in order to realize the novel, non-obvious and useful attributes exhibited by this disclosure, that, in fact, are not offered by the prior art. Said open-throughout volumetric-space 12 allows a seated person to embrace (to hug) the two-open-ends box-like slanted-structure 42 by positioning his/her hands and arms over-and-around said pair of slanted inner panels 48-48 in a cozy and comfortable resting posture that, indeed, is conducive to relaxation or sleep. Meanwhile, the short vertical panel 44 may contact said seated person's chest.

The hinged base surface 14 and the hinged slanted top surface 50, both, include a means for middle hinge 23 necessary to conveniently fold up the two-open-ends box-like slanted-structure 42, see the top left-hand illustration on FIG. 8. The required steps to fold or to unfold the two-open-ends box-like slanted-structure 42 are similar to the ones illustrated on FIG. 5.

An assortment of configurations are acceptable to construct said means for hinged corners 22s as well as said means for middle hinges 23s, as previously described above, read and see FIG. 6. Recognize that the numerals 16-16, 17-17 and 18 must be replaced by the numerals 44 or 46, 48-48 and 50 respectively.

An assortment of configurations are acceptable to construct said means for attachment 19 as previously described above, read and see FIG. 7. Recognize that the numeral 17 must be replaced by the numeral 48 since are functionally equivalent.

A variety of adequate materials are readily available to construct the two-open-ends box-like slanted-structure 42. They are described above.

During utilization, after the hinged base surface 14 has been placed on said seated person's lap, over a desk, on an airliner seat tray table or any equivalent base contiguous to said seated person, the person could place his head to rest on said the hinged slanted top surface 50 or, alternatively, place a pillow 20 on the hinged slanted top surface 50 prior to placing his head on the pillow 20.

The height "$H_S$" of the short vertical panel 44 is predetermined to adjust to said person's torso size. The width "W" of the hinged base surface 14 is predetermined to extend across said seated person's lap. The hinged slanted top surface 50 forward span "S" is predetermined to allow for comfortable head support. The height "$H_L$" of the long vertical panel 46, is longer than the height "$H_S$", its length is predetermined to attain a desired slant slope for the hinged slanted top surface 50.

FIG. 9 shows, in side views and a cross-section, a third embodiment for the disclosed Sleep Assist Device For Seated Persons comprising a two-open-ends box-like shift-able structure 52 that allows a person to place his hands and arms inside an open-throughout volumetric-space 12 and comfortably rest them over the top of a hinged base surface 14 that has been previously placed on said seated person's lap, over a desk, on an airliner seat tray table or any equivalent base contiguous to said seated person. The two-open-ends box-like shift-able structure 52 further includes a pair of vertical panels 16-16, a pair of truncated inner panels 54-54, a hinged top surface 18 and means for attachment 19 to fasten together said pair of truncated inner panels 54-54.

In operation, said person could place his head to rest on said hinged top surface 18 or, alternatively, place a pillow 20 over the hinged surface 18 prior to placing his head on the pillow 20.

Notice that said open-throughout volumetric-space 12 is enclosed within the six walls that are sequentially interconnected as follows: the hinged base surface 14 connects to one vertical panel 16 itself connects to the hinged top surface 18 itself connects to a second vertical panel 16 and itself connects to the hinged base surface 14 while said pair of truncated inner panels 54-54 connects to one of said vertical panel 16. Each connection among said six walls is made by a means for hinged corner 22. Both the hinged base surface 14 and the hinged top surface 18 include a means for middle hinge 23, a feature required to be able to foldup said third embodiment after use.

Said open-throughout volumetric-space 12 is an indispensable feature built-in all the disclosed embodiments.

Said open-throughout volumetric-space 12 allows a seated person to embrace (to hug) the two-open-ends box-like shift-able structure 52 by positioning his/hers arms and hands over-and-around said pair of truncated inner panels 54-54 in a cozy and comfortable resting posture that, indeed, is conducive to relaxation or sleep. Meanwhile, the vertical panel 16 that is connected to said pair of truncated inner panels 54-54 may contact said seated person's chest.

The height "H" of the vertical panels 16-16 is predetermined to adjust at said person torso's size. The width "W" of the hinged base surface 14 is predetermined to extend across said seated person's lap. The hinged top surface 18 forward span "S" is predetermined to allow for a comfortable head support.

Each truncated inner panel 54 silhouette includes an inclined top edge 56 and an inclined bottom edge 58 that allows said two-open-ends box-like shift-able structure 52 to be translated back and forth by a predetermined amount. See the two bottom illustrations on FIG. 9 where a backward angular displacement $\alpha_b$ and a forward angular displacement $\alpha_f$ represent said translation.

Previously or after its use, the two-open-ends box-like shift-able structure 52 can be folded up for convenient storage into an airplane's front seat pocket 24 or to be carried in a bag, purse, suitcase or briefcase. See top left-hand illustration on FIG. 5 and read .

An assortment of configurations are acceptable to construct said means for hinged corners 22s as well as said means for middle hinges 23s, which have been described above, read and see FIG. 6. Recognize that the numeral 17 must be replaced by the numeral 54.

An assortment of configurations are acceptable to construct said means for attachment 19. These are described above, read and see FIG. 7. Recognize that the numeral 17 must be replaced by the numeral 54.

A variety of adequate materials are readily available to construct the two-open-ends box-like shift-able structure 52. These materials are described above, read.

FIG. 10 shows, in planar views, utilization of flat sheet material as an acceptable approach to manufacture each of the three embodiments disclosed above. Each shown template includes a joining flap 60 that is glued to the template's free end 62 utilizing an adhesive, staples, etc. Note that on FIG. 10 a dashed line represent the means for hinged corner 22 and that a dashes-and-dots line represent the means for middle hinge 23.

SUMMARY AND SCOPE OF INVENTION

One or more embodiments of this invention may offer one or more of the following advantages when compared to the utilization of prior art sleep assist devices. The above disclosed Sleep Assist Device for Seated Persons when compared to prior art sleep assist devices exhibits the following advantages:

(1) it provides for a novel, safe, reliable, useful and less costly approach to fabricate sleep assist devices intended for utilization by seated persons.

(2) the disclosed device when folded up is relatively small and lightweight allowing a user to conveniently place it into: an airplane's seat back pocket, carry-on suitcase, a ladies' handbag, a business briefcase or a conventional suitcase.

(3) during utilization the user is able to reach an enjoyable and comfortable resting posture that is conducive to relaxation and to sleep.

(4) it is helpful to passengers traveling by airplane, bus, train and in an automobile's rear seat.

(5) it is helpful to persons wishing to nap at their workplace, at home, while waiting at a hospital or office, or during camping or at a beach outing.

(6) it is helpful to ailing persons confined to hospitals or nursing homes that need to be seated in a wheelchair or a sofa during extended periods of time.

(7) it provides a novel, useful and unobvious medium to display advertisements, passenger safety instructions or logos since its visible surfaces can be printed utilizing any of the available methods employed by the packaging industry or include affixed labels.

The above description contains many specificities; these should not be construed as limiting the scope of the invention, but rather as merely providing illustrations of some of the presently envisioned embodiments of this invention. Any replacement of parts that are functionally-equivalent is within the scope of this invention. Indeed, from the foregoing description, various other variations and changes will become apparent to those skilled in the art without departing from the spirit and scope of this invention.

The scope of this invention should be determined by the appended claims and their legal equivalents, rather than by the embodiments illustrated.

I claim:

1. A sleep assist device for use by a seated person that allows said seated person to achieve an enjoyable and comfortable resting posture, the improvement comprising: a two-open-ends box structure itself including
   (a) a hinged base panel that includes a means for middle hinge,
   (b) a hinged top panel that includes a means for middle hinge,
   (c) two vertical panels,
   (d) two inner panels and
   (e) six means for hinged corners
so that said hinged base panel connects to the first of said two vertical panels, which itself connects to said hinged top panel, which itself connects to the second of said two vertical panels, which itself connects to said hinged base panel and also each of said two inner panels connects to one of said two vertical panels whereas each of said six connections are made up of one of said six means for hinged corners therefore said preceding parts when unfolded create an open-throughout volumetric-space itself having a predetermined size whereby after said hinged base panel is placed on top of the lap of said seated person said hinged top panel becomes available to place the head of said seated person over said hinged top panel in order to attain said enjoyable and comfortable resting posture that is conducive to reach relaxation and sleep by said seated person meanwhile said seated person could bring inside said open-throughout volumetric-space his hands and arms placing them over-and-around said two inner panels or over a top surface of said hinged base panel so as to achieve further comfort, wherein in addition said six means for hinged corners plus the two said means for middle hinges allows fold up of said two-open-ends box structure facilitating its storage and transport.

2. The sleep assist device for use by a seated person of claim 1 further including a means for attachment that allows fastening together said two inner panels whereby assuring that said two-open-ends box structure cannot be unfolded.

3. The sleep assist device for use by a seated person of claim 1 further including advertisements, passenger safety instructions or logos printed on or labels affixed to surfaces of one or more of: said hinged base panel, said two vertical panels, said two inner panels or said hinged top panel, whereby additional commercial and promotional value is added to said two-open-ends box structure.

4. A sleep assist device for use by a seated person that allows said seated person to achieve an enjoyable and comfortable resting posture, the improvement comprising: a two-open-ends box slanted structure itself including
   (a) a hinged base panel that includes a means for middle hinge,
   (b) a hinged slanted top panel that includes a means for middle hinge,
   (c) a short vertical panel,
   (d) a long vertical panel,
   (e) two inner panels each comprising a slanted top edge and
   (f) six means for hinged corners
so that said hinged base panel connects to said short vertical panels, which itself connects to said hinged slanted top panel, which itself connects to said long vertical panels, which itself connects to said hinged base panel and also each of said two inner panels connects to said short vertical panel whereas each of said six connections are made up of one of said six means for hinged corners therefore said preceding parts when unfolded create an open-throughout volumetric-space itself having a predetermined size whereby after said hinged base panel is placed on top of the lap of said seated person said hinged slanted top panel becomes available to place the head of said seated person over said hinged slanted top panel in order to attain said enjoyable and comfortable resting posture that is conducive to reach relaxation and sleep by said seated person meanwhile said seated person could bring inside said open-throughout volumetric-space his hands and arms placing them over-and-around said two inner panels or over a top surface of said hinged base panel so as to achieve further comfort, wherein in addition said six means for hinged corners plus the two said means for middle hinges allows fold up of said two-open-ends box slanted structure facilitating its storage and transport.

5. The sleep assist device for use by a seated person of claim 4 further including a means for attachment that allows fastening together said two inner panels whereby assuring that said two-open-ends box slanted structure cannot be unfolded.

6. The sleep assist device for use by a seated person of claim 4 further including advertisements, passenger safety instructions or logos printed on or labels affixed to surfaces of one or more of said hinged base panel, said short vertical panel, said long vertical panel, said two inner panels or said hinged slanted top panel whereby additional commercial and promotional value is added to said two-open-ends box slanted structure.

7. A sleep assist device for use by a seated person that allows said seated person to achieve an enjoyable and comfortable resting posture, the improvement comprising: a two-open-ends box shift-able structure itself including
   a) a hinged base panel that includes a means for middle hinge,
   b) a hinged top panel that includes a means for middle hinge,
   c) two vertical panels,
   d) two trapezoidal inner panels and e) six means for hinged corners so that said hinged base panel connects to the first of said two vertical panels, which itself connects to said hinged top panel, which itself connects to the second of said two vertical panels, which itself connects to said hinged base panel and also each of said two inner panels connects to one of said two vertical panels whereas each of said six connections are made up of one of said six means for hinged corners therefore said preceding parts when unfolded together create an open-throughout volumetric-space itself having a predetermined size whereby after said hinged base panel is placed on top of the lap of said seated person said hinged top panel becomes available to place the head of said seated person over said hinged top panel in order to attain said enjoyable and comfortable resting posture that is conducive to reach relaxation and sleep by said seated person meanwhile said seated person could bring inside said open-throughout volumetric-space his hands and arms placing them over-and-around said two inner panels or over a top surface of said hinged base panel so as to achieve further comfort, wherein said two inner panels allow said hinged top panel to be moved back and forth in relation to said hinged base panel, permitting said seated person to seat between a frontward and a backwards position while maintaining the head of said seated person resting over said hinged top panel, wherein in addition said six means for hinged corners plus the two said means for middle hinges allows fold up of said two-open-ends box shift-able structure facilitating its storage and transport.

8. The sleep assist device for use by a seated person of claim 7 further including a means for attachment that allows fastening together said two inner panels whereby assuring that said two-open-ends box shift-able structure cannot be unfolded.

9. The sleep assist device for use by a seated person of claim 7 further including advertisements, passenger safety instructions or logos printed on or labels affixed to surfaces of one or more of: said hinged base panel, said two vertical panels, said two inner panels or said hinged top panel, whereby additional commercial and promotional value is added to said two-open-ends box shift-able structure.

* * * * *